United States Patent Office 3,287,283
Patented Nov. 22, 1966

3,287,283
LUBRICANTS CONTAINING COPOLYMERS OF UNSATURATED ESTERS OF DICARBOXYLIC ACID AND N-VINYLBUTYROLACTAM
Stephen J. Metro, Scotch Plains, N.J., assignor to Esso Research and Engineering Company, a corporation of Delaware
No Drawing. Filed Jan. 9, 1964, Ser. No. 336,622
5 Claims. (Cl. 252—51.5)

This invention relates to copolymers of unsaturated dicarboxylic acid esters and N-vinylbutyrolactam, oil compositions containing said copolymers, and methods of producing said copolymers. In its preferred form, the invention relates to esters of itaconic acid and $C_4$ to $C_{20}$ alcohols copolymerized with N-vinyl pyrrolidone to form a copolymer useful as a sludge dispersant in lubricating oils, particularly synthetic ester lubricating oils.

Ester oils, such as di-2-ethylhexyl sebacate, are used in the formation of aviation lubricants primarily because of their excellent temperature-viscosity properties. Various additives are added to these ester oils such as antioxidants, load-carrying agents, antiwear agents, viscosity improving agents, etc. in order to form finished lubricating oil compositions. With the trend towards more severe engine operating conditions, particularly higher temperatures, there has been a corresponding need for better dispersant additives to prevent sludge and other degradation products of the lubricant from depositing on the engine parts. Copolymers of alkyl methacrylate and N-vinyl pyrrolidone have been used in prior ester oil lubricants as a sludge dispersant. However, these methacrylate/N-vinyl pyrrolidone copolymers have been found to suffer from several deficiencies which militate against their use in synthetic ester lubricating oil compositions for more advanced engines. For example, the methacrylate-pyrrolidone copolymer is thermally and shear unstable, and has an artificial effect upon the viscosity index of the oil composition. These methacrylate-pyrrolidone copolymers will initially increase the viscosity and viscosity index of the lubricating oil composition. But, during operating use, when subjected to high temperature and mechanical shear, the copolymer chains are apparently broken very rapidly. These broken copolymer chains result in the oil composition becoming less viscous than desired, and the viscosity index of the composition also decreases. The present invention is based on the discovery that copolymers much superior to the aforesaid prior methacrylate-pyrrolidone copolymers, can be prepared by copolymerizing dicarboxylic acid esters with N-vinyl pyrrolidone. These new copolymer materials when compared to the prior methacrylate-pyrrolidone copolymers, are more shear stable, they do not appear to exert any initial thickening effect upon the oil which is frequently desirable, they do not degrade as much under heat, and are superior in sludge dispersing ability. These new copolymers are therefore particularly suitable for use in synthetic aircraft engine oils which are subjected to stringent operating conditions. However, the copolymers of the invention can also be used as sludge dispersants in mineral lubricating oils, petroleum fuel oils, kerosene, gasoline, and other hydrocarbons.

The N-vinylbutyrolactam can be represented by the general formula:

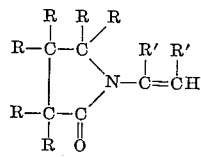

wherein R and R' may be hydrogen or $C_1$ to $C_8$, e.g. $C_1$ to $C_3$ alkyl groups. The number of carbon atoms in the butyrolactam will generally be 6 to 20, e.g. 6 to 12. The preferred compound is 2-N-vinyl pyrrolidone, i.e., wherein both R and R' in the general formula described above are hydrogen.

While esters of itaconic acid will be generally used because of their ready availability, esters of other α-alkylene dicarboxylic acids such as α-methylene malonic esters, α-methylene glutaric esters, α-methylene adipic esters, α-propylene adipic esters, etc. may be used in place of the itaconic acid ester. The general formula of these α-alkylene dicarboxylic acid esters which may be used is shown below:

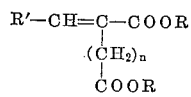

wherein n is an integer of 0 to 3, R is a straight or branched chain alkyl group containing from 1 to 24, preferably 5 to 13 carbon atoms, and R' is hydrogen or a methyl or ethyl radical. The total number of carbon atoms in the molecule will generally be 15 to 34, and preferably is 15 to 21.

The polymerization is carried out by copolymerizing about 20 to 0.1, preferably 10 to 0.5, molar proportions of the ester per molar proportion of butyrolactam. The copolymerization will be generally carried out at a temperature of about 100 to 200° F., preferably 130 to 170° F., for about 1 to 60, preferably 4 to 48 hours in the presence of a catalyst. The polymerization may be carried out in the presence of an inert solvent such as dioxane, or in bulk with no solvent present. Suitable initiators or catalysts for the reaction will include peroxide type catalysts such as benzoyl peroxide, t-butyl hydroperoxide, cumene hydroperoxide. Usually, about 0.05 to 1.0, preferably .1 to .8 wt. percent catalyst, based upon the weight of the monomers, will be used. Also, if solvent is used, the volume amount will usually be equal to about 10% to 200% of the volume of the monomers.

The molecular weight of the resulting copolymer will be generally in the range of 1,000 to 10,000, preferably 2,000 to 6,000, as determined by correlation to Staudinger molecular weight for polyethylene.

The inventive copolymerization typified by copolymerizing an itaconate with 2-N-vinyl pyrrolidone in a 1:1 molar ratio, is compared with the prior art copolymer of octyl methacrylate and 2-N-vinyl pyrrolidone by the following equations:

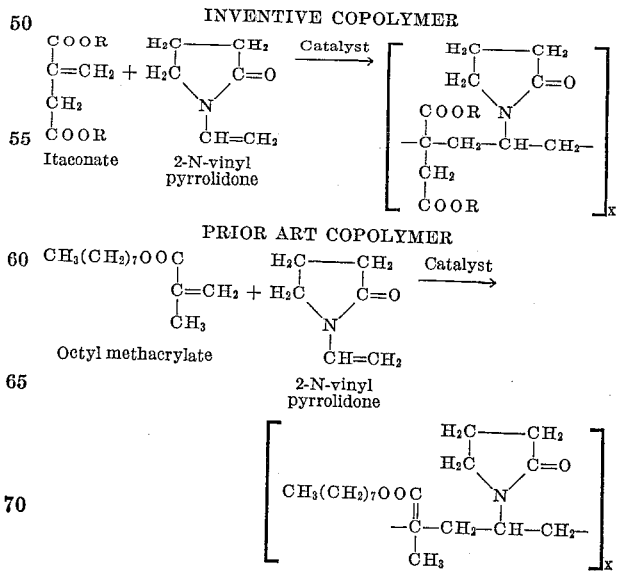

The synthetic ester lubricating oils include diesters represented by the formula:

$$R'OOC-R-COOR'$$

wherein R is a straight or branched chain hydrocarbon radical of a $C_6$ to $C_{12}$ alkanedioic acid, R' represents an alkyl radical of a $C_6$ to $C_{16}$ branched or straight chain alcohol and the total number of carbon atoms in the molecule is about 20 or more. Specific examples of such diesters include di(2-ethylhexyl) sebacate, di($C_8$ Oxo) azelate, di($C_{10}$ Oxo) adipate, di-2,2,4-trimethylpentyl sebacate, etc.

Recently, fully esterified hindered esters prepared from alcohols having no β-hydrogen and carboxylic acids having no α-hydrogen have become known for aviation use. These esters are particularly good for high temperature lubrication since they are exceptionally stable because they are completely hindered at the ester linkage, which generally is otherwise the weakest link in an ester molecule from the standpoint of heat stability, oxidation and hydrolysis. The saturated alcohol used to prepare these esters will generally have 1 to 4 hydroxy groups, and will be free of hydrogen radicals attached to the carbon atoms beta to each of said hydroxy groups, and will generally have a total of 4 to 8 carbon atoms. The acid which is used will be usually saturated, preferably has one or two carboxylic acid groups, will be free of hydrogen atoms attached to the carbon atoms alpha to the carboxylic acid group or groups, and will usually contain 7 to 20 carbon atoms. Examples of such no β-hydrogen alcohols include trimethylolethane, trimethylolpropane, pentaerythritol, and alcohols having the structures:

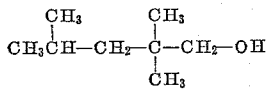

and

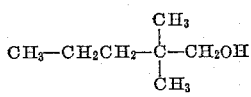

Examples of such no α-hydrogen acids include α,α-dimethyl valeric; α-ethyl, α-methyl caproic; α,α-dimethyl propionic; α,α-dimethyl octanoic; α,α,α',α'-tetramethyl pimelic; etc.

The copolymer of the invention can also be used in compositions containing complex esters. These complex esters are frequently used as blending agents with other less viscous esters to tailor-make an ester lubricant composition. The more important of the complex esters can be represented by the general formula:

$$R_1-OOCR_2COO-(R_3-OOCR_4COO)_n-R_5$$

wherein $R_1$ and $R_5$ are alkyl radicals of monohydric alcohol, preferably having no beta hydrogen, $R_2$ and $R_4$ are hydrocarbon radicals of dicarboxylic acid, and $R_3$ is the divalent hydrocarbon or hydrocarbonoxy radical of a glycol or polyglycol, which glycol or polyglycol preferably has no beta hydrogen. "n" in the complex ester molecule will range from 1 to 6, usually 1 to 3, depending upon the product viscosity desired, and is controlled by the relative molar ratio of the glycol or polyglycol to the dicarboxylic acid. In preparing the complex ester, there will usually be some simple diester formed, i.e. $n=0$, but this will generally be a minor portion, e.g. 10 to 40 wt. percent of the complex ester esterification reaction product.

Some specific materials used in preparing the above types of complex esters are as follows: Neo alcohols having 6 to 13 carbon atoms such as 2,2,4-trimethylpentanol-1; 2,2-dimethylhexanol-1; 2,2-dimethylpentanol-1; 1-methylcyclohexylmethanol; 2,2-dimethylbutanol-1; 2,2-dimethyldecanol-1; $C_6$ to $C_{13}$ dicarboxylic acids such as sebacic, adipic, azelaic, dodecanedioic acid and brassylic acid; neo glycols such as 2,2-dimethylpropanediol-1,3; 2-ethyl-2-butyl propanediol-1, 3; 2,2-diethylpropanediol-1,3; 2,2-dimethylbutanediol-1,3; etc. In general, the complex esters will have a total of 20 to 80, preferably 40 to 65, carbon atoms per molecule. Complex esters and methods for their preparation are known in the art and have been described in various patents. Preferably the complex esters are prepared by reacting 1 mole of glycol, 2 moles of dicarboxylic acid and 2 moles of alcohol. This will result in about 35 wt. percent of diester of the dicarboxylic acid and alcohol, and about 65 wt. percent of complex ester of the formula: Alcohol–Acid–(Glycol–Acid)$_x$–Alcohol where $x$ averages about 1.8.

Various other additives can also be added to the lubricating compositions of the invention in amounts of about 0.001 to 10.0 weight percent each, based on the total weight of the composition. Examples of such other additives include: rust preventives such as calcium petroleum sulfonate or sorbitan monooleate; oxidation inhibitors such as phenyl-alpha-naphthylamine, paraaminodiphenylamine, 3,7 - dioctylphenothiazine, p,p' - dioctyldiphenylamine or phenothiazine; load carrying agents such as chlorinated biphenyl, tricresyl phosphate and free sebacic acid; etc.

The oil-soluble copolymers of the invention can be used in amounts of 0.1 to 10.0 wt. percent, preferably 0.5 to 5.0 wt. percent, based on the weight of the total composition, in oil or hydrocarbons. As previously indicated, these copolymers are particularly useful in ester lubricating oils.

The invention will be further understood by reference to the following examples which include a preferred embodiment of the invention.

EXAMPLE I

*Polymer A.*—A copolymer was prepared by copolymerizing 181 gms. (0.5 mole) of di-2,2,4-trimethylpentyl itaconate with 55 gms. (0.5 mole) of 2-N-vinyl pyrrolidone, at 70° C. in a constant temperature compartment, for 48 hours, in the presence of 0.3 wt. percent, based on the total weight of monomers, of benzoyl peroxide as an initiator, in about 75 ml. of dioxane as a solvent. The copolymer product was then filtered through Hyflo (diatomaceous earth filter aid), and then stripped under a pressure of 3 mm. Hg and a pot temperature of about 300° C. The residue, which is the inventive copolymer, was a tacky, brown, semi-solid having a molecular weight of about 2500.

*Polymer B.*—This copolymer was prepared in the same manner as Polymer A except that 0.5 wt. percent benzoyl peroxide was used.

*Polymer C.*—Di-2,2,4-trimethylpentyl itaconate was homopolymerized using 0.3 wt. percent benzoyl peroxide at 70° C. for 48 hours.

Lubricating oil compositions were prepared by dissolving 3 parts by weight of Polymers A, B, and C in 100 parts by weight of Hercolube A containing 2 parts by weight of paraminodiphenylamine as antioxidant. Hercolube A is pentaerythritol fully esterified with a mixture of saturated aliphatic carboxylic acids containing from 4 to 9 carbon atoms, and sold by the Hercules Powder Company.

The resulting oil compositions were tested for sludging and coking in a test apparatus comprising a weighed aluminum tube mounted in a glass reservoir and heated to about 595° F. The oil composition (about one quart) is continuously recycled through the apparatus and enters at the top of the reservoir at 375° F. and flows downwardly past the aluminum tube while air is bubbled up from the bottom of the reservoir through the downflowing oil composition. The oil then passes through a filter and is recycled. At the end of 30 hours the grams of coke that formed on the aluminum tube and the grams of sludge on the filter screen are determined.

The compositions tested and the results obtained are summarized in Table I which follows:

*Table I*

| Wt. Percent Polymer Added | Coke, gm. | Sludge, gm. | Rating [1] |
|---|---|---|---|
| None | 0.58 | 1.13 | 6.93 |
|  | 0.46 | 1.02 | 5.62 |
| 3% Polymer A | 0.17 | 0.97 | 2.67 |
| 3% Polymer B | 0.03 | 0.67 | 0.97 |
| 3% Polymer C | 0.60 | 0.78 | 6.78 |

[1] Rating or deposition number equals 10 times the grams of coke plus the grams of sludge, e.g. 0.58×10×1.13=6.93.

As seen by the Table I, Polymers A and B, representing the invention, very effectively reduced the amount of coking and sludging, while the itaconate homopolymer (Polymer C) had little effect.

EXAMPLE II

Di-2,2,4-trimethylpentyl itaconate was copolymerized with 2-N-vinylpyrrolidone using a mol ratio of itaconate to pyrrolidone of 10:1.995 and polymerizing to a molecular weight of about 3,000 by the same procedure used to prepare Polymer A of Example I.

EXAMPLE III

Example II was repeated but using a mole ratio of 10:3.82.

EXAMPLE IV

Example II was repeated but using di-2-ethylhexyl itaconate as the ester, in a molar ratio of itaconate to said pyrrolidone of 10:2.

The properties of the itaconate esters of Examples II to IV, are summarized in Table II which follows:

*Table II*

PROPERTIES OF COPOLYMERS OF 2-N-VINYL PYRROLIDONE WITH VARIOUS ITACONATES

| Designation | Example II | Example III | Example IV |
|---|---|---|---|
| Copolymer of N-vinyl-pyrrolidone and— | Di-2,2,4-trimethylpentyl itaconate. | Di-2,2,4-trimethylpentyl itaconate. | Di-2-ethylhexyl itaconate. |
| Physical state | Light yellow, very soft solid. | Light yellow, soft solid. | Viscous yellow liquid. |
| K.V./210° F., cs | 1,268 | 19,500 | 133.8. |
| Molecular weight, approximate (Staudinger). | 3,000 | 5,000 | 3,000. |
| Mol. ratio of itaconate ester to N-vinyl-pyrrolidone. | 10:1.995 | 10:3.82 | 10:2. |
| Wt. percent N | 0.77 | 1.40 | 0.8. |

EXAMPLE V

A base aviation type synthetic ester lubricating oil composition was prepared by simple mixing of the following, wherein parts are parts by weight: 100 parts of trimethylolpropane fully esterified with a mixture of saturated fatty acids having about 6 to 10 carbon atoms and averaging about 8 carbon atoms as the lubricating oil; 5 parts of dioctyl diphenylamine and 0.4 part of phenothiazine as antioxidants; 0.015 part of sebacic caid as an extreme pressure agent and corrosion inhibitor; and 0.001 part of a polysilicone antifoamant.

To portions of 100 parts by weight each of the above base composition was added 1 part by weight of the copolymers of Examples II, III and IV, and 1.5 parts by weight of Acryloid HF-866 which is a solution of about 30 wt. percent of the copolymer of methacrylate ester and 2-N-vinyl pyrrolidone in 70 wt. percent di-2-ethylhexyl sebacate. The intrinsic viscosity of this methacrylate copolymer per se in toluene is about 0.88. The methacrylate ester portion of the copolymer comprises a mixture of esters having alkyl groups within the range of about 4 to 16 carbon atoms and averaging about 8 or 9 carbon atoms per alkyl group of the ester.

The above compositions were then tested for shear stability in a Sonic Shear Stability Test carried out according to the procedure of ASTM vol. 38, 1961, appendix 12. This test is also described in MIL-L-23699. In brief, 30 ml. of the polymer containing test fluid is subjected to sonic irradiation in a sonic oscillator for 5 minutes and the viscosity changes are measured.

The compositions tested and the results obtained are summarized in Table III which follows:

*Table III*

SONIC SHEAR STABILITY

|  | K.V./210° F., cs. | | | K.V./100° F., cs. | | |
|---|---|---|---|---|---|---|
|  | Initial | Final | Percent Decrease | Initial | Final | Percent Decrease |
| Base [1] | 4.6 |  |  | 23 |  |  |
| Base+1.0% Example II | 4.62 | 4.60 | 0.4 | 23.66 | 23.43 | 1.0 |
| Base+1.0% Example III | 4.71 | 4.70 | 0.2 | 24.22 | 24.16 | 0.2 |
| Base+1.0% Example IV | 4.63 | 4.59 | 0.9 | 23.65 | 23.55 | 0.4 |
| Base+1.5% Acryloid HF-866 [2] | 5.43 | 4.90 | 9.8 | 27.50 | 24.72 | 10.1 |

[1] 100 parts trimethylolpropane ester, 5 parts dioctyl diphenylamine, 0.4 part phenothizaine, 0.015 part sebacic acid and 0.001 part polysilicone.
[2] 30% copolymer of methacrylate and 2-N-vinyl pyrrolidone in 70 wt. percent di-2-ethylhexyl sebacate.

As seen by Table III, the prior art material represented by the Acryloid HF-866, which is a commercially available detergent polymer from the Rohm & Haas Company, showed a significant decrease in viscosity (on the order of about 10%) apparently caused by breaking of the polymer chains. On the other hand, the trimethylolpropane ester oil composition containing the polymers of Examples I, III and IV, were exceedingly shear stable. Also note that the test of Table III was made even more severe on the inventive polymers due to the fact that they were used in larger concentrations (i.e. 1%) as compared to the smaller effective concentration of the methacrylate copolymer (0.45% actual copolymer). The smaller change in viscosity of the inventive copolymers is very desirable in engines since the oil composition will thereby substantially maintain its initial flow and cooling characteristics during engine operation.

EXAMPLE VI

To demonstrate the thermal stability of the polymers of Examples II to IV, as compared to the prior art Acryloid HF-866, Polymer Thermal Stability Tests were carried out as follows:

1, 2 and 3 parts by weight of the test polymers were dissolved in 100 parts by weight of the trimethylolpropane ester of Example V. The resulting solutions were then heated in an aluminum block at 617° F. for 24 hours under a nitrogen atmosphere. This test is fully described in British Ministry Specification DERD 2497, issue No. 2. The trimethylolpropane ester was used as the base oil because under this high temperature it remains liquid while many of the more common esters like dioctyl sebacate turn solid.

The compositions tested and the results obtained are summarized in Table IV which follows:

*Table IV*

POLYMER THERMAL STABILITY TEST

| Polymer | Concentration, Wt. Percent [1] | Percent Viscosity Change at 100° F. |
|---|---|---|
| None | | +3.12 |
| Acryloid HF-866 | 1 | −5.43 |
| Do | 2 | −14.8 |
| Do | 3 | −25.3 |
| Example II | 1 | +2.1 |
| Do | 2 | +2.3 |
| Do | 3 | +1.7 |
| Example III | 1 | +2.2 |
| Do | 2 | +1.31 |
| Do | 3 | −0.74 |
| Example IV | 1 | +1.23 |
| Do | 2 | +0.62 |
| Do | 3 | 0.0 |

[1] Wt. percent based on weight of the oil.

As seen by Table IV, the prior art Acryloid HF-866 shows significant viscosity changes (particularly when considering it is only 30% active ingredients), while the inventive polymers (100% active ingredient) of Examples II to IV show very little change, thereby demonstrating the superiority of the inventive polymers with regard to heat stability at high temperatures.

EXAMPLE VII

A series of tests were carried out to determine the effectiveness of the inventive polymers as dispersing agents by adding 1 part by weight of said polymers to 100 parts by weight of a fully formulated synthetic ester aviation lubricant. This lubricant consisted of by weight: 100 parts of trimethylolpropane ester (same as in Example V), and as oxidation inhibitors: 5 parts of dioctyl diphenylamine, 0.5 part of phenyl-α-naphthylamine and 1 part of a glutamate of the formula:

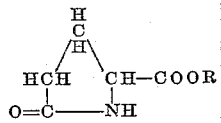

wherein R is the alkyl group of 2,2,4-trimethylpentanol, said glutamate being prepared by condensing glutamic acid with 2,2,4-trimethylpentanol.

The resulting compositions were tested for 30 hours in the High Temperature Deposition Test, which is the sludging and coking test previously described with regard to Example I.

The compositions tested and the results obtained are summarized in Table V which follows:

*Table V*

DISPERSANCY OF POLYMERS—30 HOUR HIGH TEMPERATURE DEPOSITION TEST

| Polymer in Lubricant | None | 1% Example II | 1% Example III | 1% Example IV |
|---|---|---|---|---|
| Coke, gms | 0.239 | 0.157 | 0.098 | 0.001 |
| Sludge, gms | 0.077 | 0.115 | 0.142 | 0.112 |
| Deposition No | 2.467 | 1.685 | 1.122 | 0.122 |

As seen by Table V, the lubricants containing the polymer of the invention (Examples II, III and IV) showed a considerable improvement over the lubricant without the polymer with regard to coke and sludge formation during the test. The product of Example IV was particularly good in this respect.

EXAMPLE VIII

A fully formulated synthetic aviation lubricant was prepared consisting of by weight: 90 parts of trimethylolpropane ester (same as in Example V); 10 parts of a no β-hydrogen complex ester; 5 parts of dioctyl diphenylamine; 0.5 part of phenothiazine; 0.5 part of p-amino diphenylamine; 0.5 part of phenyl-alpha-naphthylamine; 0.015 part of sebacic acid; and 10 parts of the glutamate of Example VII.

The no β-hydrogen complex ester used above was prepared by simultaneous reaction of one molar portion of neo-pentyl glycol (2,2-dimethylpropanediol-1-3), two molar proportions of sebacic acid and about two molar proportions of 2,2,4-trimethylpentanol-1.

To 100 parts by weight of the above lubricant was added 1 part by weight (1%) each of the polymers of Examples II and III following which the compositions were subjected to the 30 Hour High Temperature Deposition Test previously described. The results obtained are summarized in Table VI which follows:

*Table VI*

| Polymer in Lubricant | None | Example III | | Example IV | |
|---|---|---|---|---|---|
| Coke, gms | 0.579 | 0.371 | 0.331 | 0.342 | 0.392 |
| Sludge, gms | 0.532 | 0.089 | 0.226 | 0.215 | 0.122 |
| Deposition No | 6.322 | 3.799 | 3.536 | 3.635 | 4.042 |

As seen by Table VI, the polymers of the invention (Examples III and IV) showed significant improvements in cleanliness as illustrated by their lower coke, sludge, and deposition numbers as compared to the lubricant without these polymers.

What is claimed is:

1. An aviation lubricating oil composition comprising a major amount of a carboxylic acid ester lubricating oil, and dissolved therein as a sludge dispersant, about 0.1 to 10.0 wt. percent, based on the weight of the total composition, of a copolymer consisting essentially of (a) N-vinylbutyrolactam having the general formula:

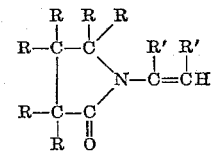

wherein R and R' are selected from the group consisting of hydrogen and $C_1$ to $C_8$ alkyl groups, and (b) a diester of an α-alkylene dicarboxylic acid having the general formula:

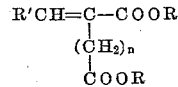

wherein $n$ is 0 to 2, R is a branched chain $C_5$ to $C_{13}$ alkyl group having a $C_1$ to $C_2$ branch on the number 2 carbon atom and R' is selected from the group consisting of hydrogen and $C_1$ to $C_2$ alkyl groups, said ester having a total of 15 to 34 carbon atoms, said copolymer having a molecular weight of about 1,000 to 10,000 and being formed by copolymerizing about 20 to 0.1 molar proportions of said ester per molar proportion of said butyrolactam.

2. An aviation lubricating oil composition comprising a major amount of a synthetic carboxylic acid ester lubricating oil, and dissolved therein as a sludge dispersant, about 0.5 to 5 wt. percent of a copolymer consisting essentially of (a) N-vinylbutyrolactam having the general formula:

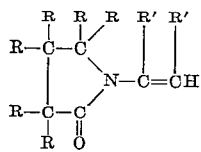

wherein R and R' are selected from the group consisting of hydrogen and $C_1$ to $C_3$ alkyl groups, and (b) an ester of an α-alkylene dicarboxylic acid having the general formula:

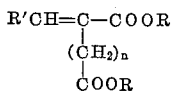

wherein $n$ is 0 to 3, R is a $C_5$ to $C_{13}$ alkyl group including a $C_1$ to $C_2$ branch on the number 2 carbon atom and R' is selected from the group consisting of hydrogen and $C_1$ to $C_2$ alkyl groups, said ester having a total of 15 to 21 carbon atoms, said copolymer having a molecular weight of about 2,000 to 6,000 and being formed by copolymerizing about 10 to 0.5 molar proportions of said ester per molar proportion of said butyrolactam.

3. A lubricating oil composition according to claim 2, wherein said butyrolactam is 2-N-vinyl pyrrolidone.

4. A lubricating oil composition according to claim 3, wherein said acid is an itaconic acid.

5. A lubricating oil composition comprising a major proportion of trimethylolpropane fully esterified with a $C_6$ to $C_{10}$ fatty acid, and dissolved therein as a sludge dispersant, about 0.5 to 5 wt. percent, based on the weight of the total composition, of a copolymer of 2,000 to 6,000 molecular weight and consisting essentially of 2-N-vinyl pyrrolidone and di-2,2,4-trimethylpentyl itaconate copolymerized in a molar ratio of about 0.5 to 10 moles of said itaconate per mole of said pyrrolidone.

References Cited by the Examiner

UNITED STATES PATENTS

| | | | |
|---|---|---|---|
| 2,497,705 | 2/1950 | Werntz | 260—85.7 |
| 2,667,473 | 1/1954 | Morner et al. | 260—85.7 |
| 2,737,496 | 3/1956 | Catlin | 252—51.5 |
| 2,888,410 | 5/1959 | Buchholz | 260—86.1 X |
| 2,944,974 | 7/1960 | Lorensen et al. | 252—51.5 |
| 3,053,766 | 9/1962 | Munsell et al. | 252—51.5 X |
| 3,126,344 | 3/1964 | Matuszak et al. | 252—51.5 |
| 3,147,222 | 9/1964 | Bauer | 252—51.5 |

FOREIGN PATENTS 866,498   4/1961   Great Britain.

OTHER REFERENCES

Barnes et al.: "Synthetic Ester Lubricants," Lubrication Engineering (August 1957), pages 454–458.

DANIEL E. WYMAN, *Primary Examiner.*

P. P. GARVIN, *Assistant Examiner.*